United States Patent [19]
Morton

[11] 3,833,191
[45] Sept. 3, 1974

[54] POWERED AIRCRAFT EJECTION SEAT

[76] Inventor: Raymond C. Morton, 3030 Citrus St., Oxnard, Calif. 93030

[22] Filed: Nov. 22, 1971

[21] Appl. No.: 201,013

[52] U.S. Cl. .......................................... 244/122 A
[51] Int. Cl. .......................................... B64d 25/10
[58] Field of Search ..... 244/122 R, 122 A, 122 AC, 244/122 AD, 138 A, 17.11, 17.15, 17.13, 17.19

[56] References Cited
UNITED STATES PATENTS

| | | | |
|---|---|---|---|
| 2,396,130 | 3/1946 | Sbrilli............................. | 244/17.19 |
| 2,457,376 | 12/1948 | Isacco.............................. | 244/138 |
| 2,640,549 | 6/1953 | Isacco.............................. | 416/22 |
| 2,738,021 | 3/1956 | Nagler............................. | 416/20 |
| 2,941,763 | 6/1960 | Oleksij............................ | 244/138 |
| 3,013,493 | 10/1961 | Fletcher.......................... | 102/35.6 |
| 3,153,521 | 10/1964 | Laufer et al. .................. | 244/17.11 |
| 3,362,662 | 1/1968 | McIntyre et al. ............... | 244/122 |
| 3,362,665 | 1/1968 | Larsen et al. .................. | 244/138 |
| 3,498,573 | 3/1970 | Hermann........................ | 244/17.11 |
| 3,662,978 | 5/1972 | Hollrock......................... | 244/122 A |

*Primary Examiner*—Trygve M. Blix
*Assistant Examiner*—Gregory W. O'Connor
*Attorney, Agent, or Firm*—Richard S. Sciascia; Joseph M. St. Amand

[57] ABSTRACT

A device for enhancing the survival prospects of a pilot evacuating an aircraft over enemy-held territory by providing him with up to fifty miles of powered flight. A turbinepowered rotor blade assembly is attached to a conventional ejection seat, and is under the control of the pilot. By directing a portion of the seat's jet blast against a movable rudder member, the pilot is able to guide the unit in any desired direction. A feature of the concept resides in the provision of contrarotating helicopter rotor blades which may be telescoped to facilitate stowage and reduce the overall size of the unit. In the vent of malfunction the pilot may descend by conventional parachute.

9 Claims, 14 Drawing Figures

POWERED AIRCRAFT EJECTION SEAT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention is in the field of aircraft ejection seats and particularly powered seats capable of sustained flight whereby personnel evacuating a stricken aircraft may maneuver from a hostile to a safe territory.

2. Discussion of the Prior Art

The rescue of airmen forced to abandon aircraft over a hostile area presents a serious problem. Heretofore, airmen have been forced to abandon their aircraft over unfriendly territory through ejection seat systems and, though such systems permit an occupant to eject at high aircraft speeds, they do not permit him to maneuver the seat after ejection.

In the prior art also are disclosed small power-driven helicopters capable of transporting a single person for short distances. These constructions, however, are not available to an airman evacuating a doomed aircraft in an emergency situation.

SUMMARY OF THE INVENTION

A pilot-occupied ejected aircraft seat deploys a helicopter type rotor assembly which is powered to provide flight sustaining and maneuvering capability to allow a jettisoned pilot to reach a safe area.

STATEMENT OF THE OBJECTS OF THE INVENTION

It is an object of the present invention to provide an ejection seat sustaining system which is automatically deployed into operating condition when the seat is ejected, and will materially extend the glide path of the seat during its descent.

A further object is to provide means for compactly stowing such a helicopter rotor arrangement in folded condition but so that it will be constantly ready to automatically deploy into operating condition upon seat ejection.

A further object is to provide such a helicopter rotor assembly with power means to permit seat climb or to further extend the glide path of the seat after ejection.

Still another object is to provide means to permit directional control of the seat during helicopter rotor supported flight.

An additional object is to provide an ejection seat sustaining helicopter rotor assembly which is light in weight, may compactly be stowed when not in use, and is expendable at termination of its flight.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
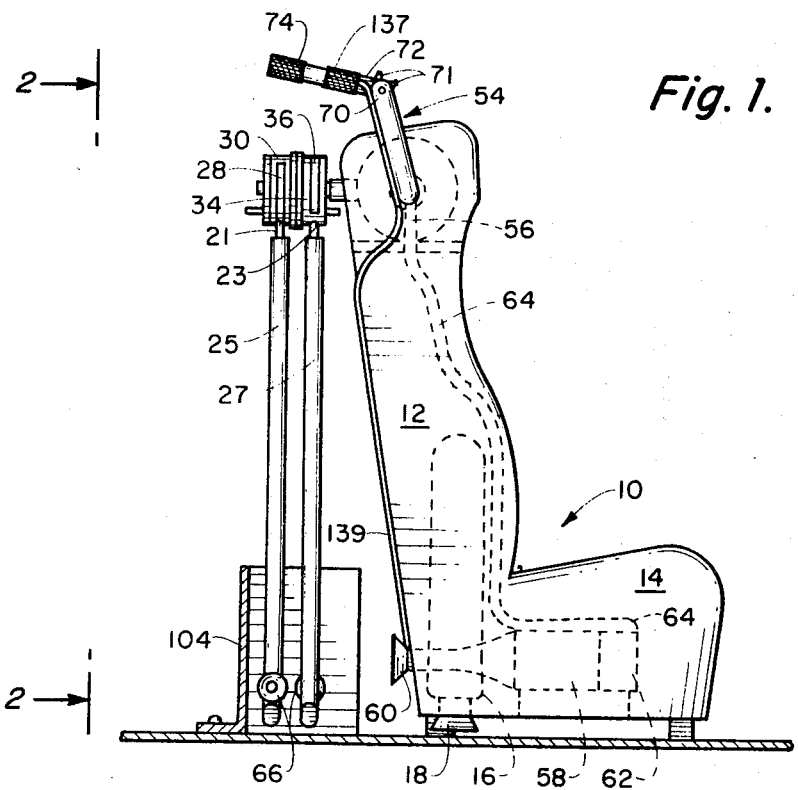
FIG. 1 is a side elevational view with a portion broken away of an aircraft seat constructed in accordance with the present invention with rotor blades folded.

Referring now to the drawings in detail, there is illustrated in FIG. 1 an ejection-type aircraft occupant seat 10 of generally conventional style including a substantially vertical back portion 12 and a substantially horizontal seat portion 14. As usual in ejection-type aircraft seats there is incorporated in the back portion 12 a main seat propulsion rocket motor 16 having a downwardly directed outlet nozzle 18. Such seat assembly may be suitably mounted in the aircraft cockpit for vertical movement in the ejection mode to propel the seat and its occupant in an upward direction out of the aircraft. Of course, the seat in its vertical movement is guided by conventional ejection seat guide rails, and the usual cockpit hood-unlatching and jettisoning means may be employed with the present arrangement — all as is well known in the art and forms no part of the present invention.

This invention adds to the foregoing seat a helicoptertype rotor assembly which, when deployed and power driven, sustains the seat and the pilot supported thereby until the assembly has been maneuvered over more hospitable territory, whereupon the pilot may either slowly descend or may abandon the seat and descend by the use of a conventional parachute.

In the illustrated embodiment the helicopter type rotor assembly includes two side by side contrarotating rotor assemblies, the blades of which are airfoil shaped in cross-sectional contour and, in the embodiment shown, each assembly is made up of opposed inner or central blade portions 20, 21, 22 and 23 and outer or peripheral sleeve type blade tip extensions 24, 25, 26 and 27 of similar contour. As shown the outer sleeve extensions may telescope over the ends of the inner or central blade portions for compactness during storage, the entire rotor assembly normally being folded together so that the rotor blades lie parallel to and behind the vertical seat back portion 12 in a fashion shown in FIGS. 1 and 3 and described hereinafter.

Discussing in detail the upper rotor assembly, the inner blade portions 20, 21, 22 and 23 are each provided with an integral enlarged central hub 28, 30, 34 and 36 respectively formed integral therewith. Hollow stub shafts 32 and 38 (FIG. 5) provide a central pivot support about which the hub portions are allowed limited rotation as will hereinafter be described in detail.

It will be noted that the upper and lower rotor assemblies are similar in construction since each blade member has its enlarged hub portion supported upon a central pivot support stub shaft. As shown the entire contrarotating assemblies may be supported in a bearing assembly 40 mounted on horizontally oriented support fixture 42 housed in the upper part of seat back 12 and movable to carry the rotor assemblies from a stowed position behind the seat back to an operating position above the seat and its occupant. During such movement the bearing assembly 40 moves through slot 41.

The support fixture 42 includes a tubular upright sleeve 44 and the combined upper and lower rotor assemblies are journalled therein by means of a downwardly directed hollow rotor support stem 46 supported by radial/thrust bearings 48 so that the combined rotor assemblies are free to rotate but are supported and aligned by the attitude of the support fixture 42. Suitable stops may be provided to limit movement of the bearing assembly 40 in each position.

Figure 2:
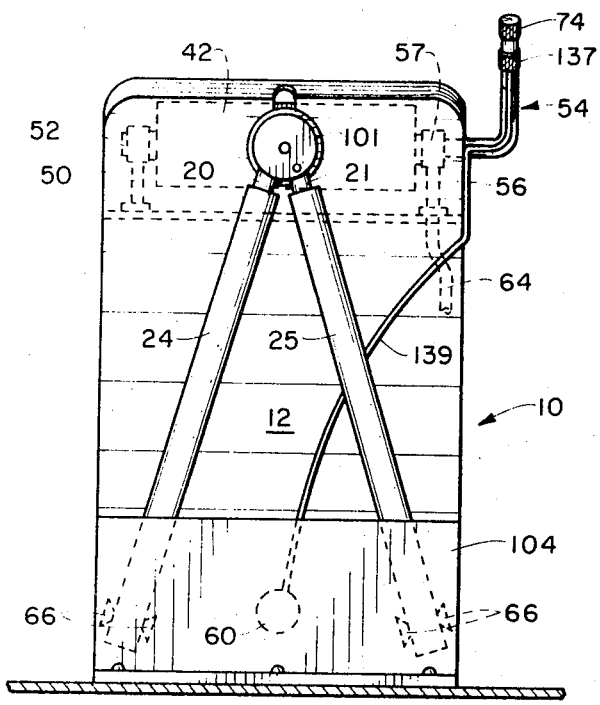
FIG. 2 is a rear view of the seat of FIG. 1 showing the manner in which the folded blades of both rotor assemblies may be housed in a single blade-tip restraining pocket at the rear of the seat until withdrawn for use.
Figure 3:
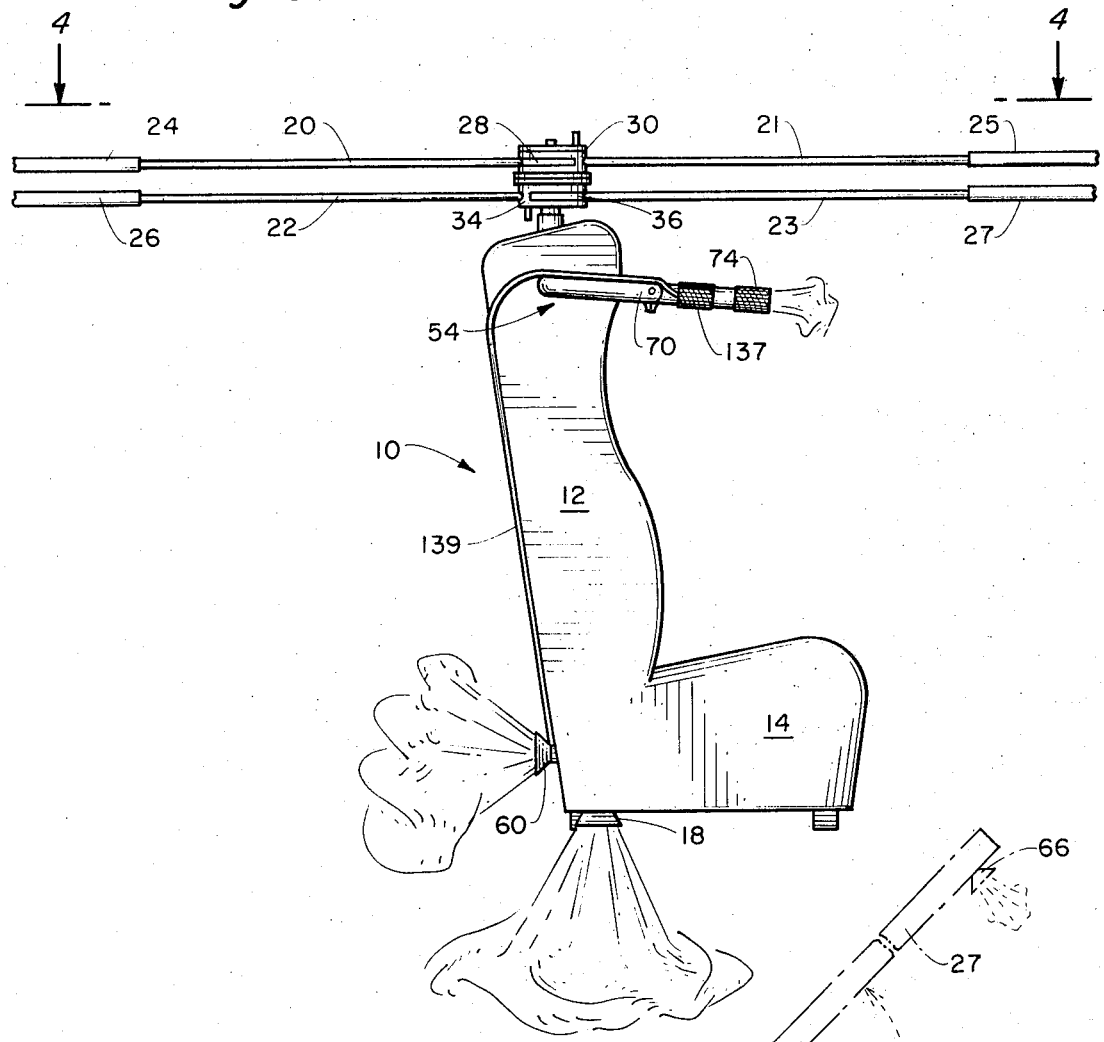
FIG. 3 is a change-position view of the seat of FIG. 1 showing the twin seat-sustaining rotors in the erected position to sustain an ejected seat and occupant and substantially lengthen the guide path of an ejected seat assembly.
Figure 4:
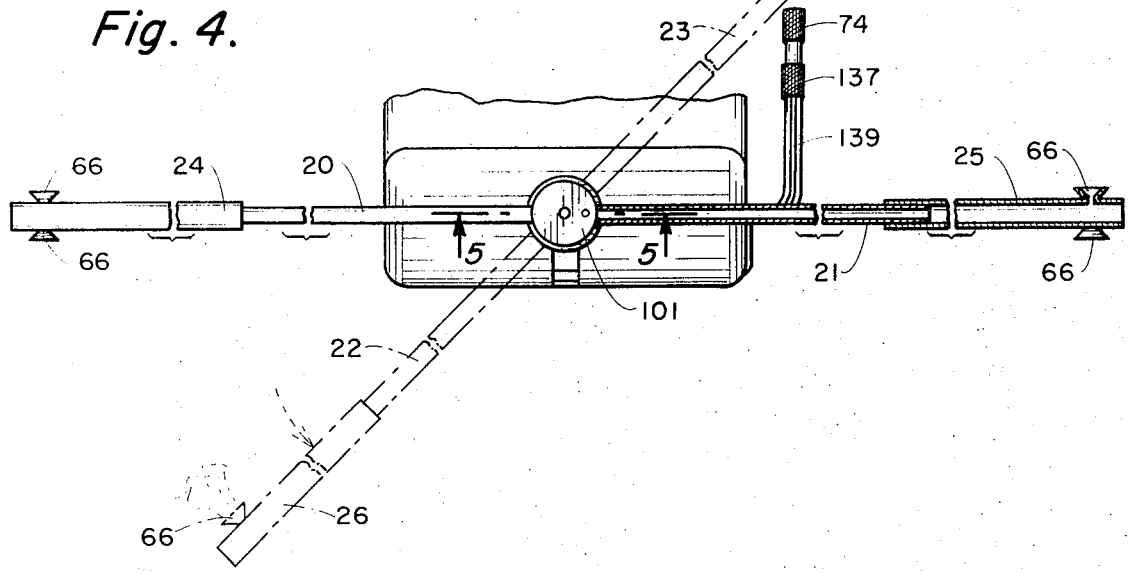
FIG. 4 is a top plan view with a portion broken away of the rotor assembly of FIG. 3 with one of the contrarotating telescoping blade rotors shown rotated to a phantom line depicted change position.

The support fixture 42 may be so mounted on the upper rear portion of the vertical seat back that it is readily rotatable on its horizontal axis from the rotor blade-folded position of FIGS. 1 and 2 to the upright rotor blade tip extended and deployed position of FIGS. 3 and 4. To achieve this, such housing may be supported by spaced seat mounted brackets 50 and 56 (FIG. 2) which support a support fixture mounting shaft 52. A rotor attitude control arm 54 forms an extension of one end of shaft 52.

Movement of the rotor assemblies from one position to the other may be assisted by a conventional telescoping piston and sleeve arrangement, may be spring biased toward the deployed position, or the assembly may include a piston and crank arm, said piston being subjected to propulsion gas pressure to force it to the extended position, thereby erecting the housing assembly to the vertical or deployed position. Such devices are well known in the art. Slot 41 in the seat back 12 receives the rotor bearing assembly 40 and allows it to move from its horizontal to its vertical position. The extreme ends of said slot 41 may form stops to limit movement of bearing assembly 40.

There may be located within the horizontal seat 14 a turbine engine 58 having a rearwardly directed discharge nozzle 60, the direction of reaction of which may be varied by any well known rudder assembly or nozzle thrust control assembly which may be either mechanically, hydraulically or pneumatically manipulated in order to provide the pilot of the vehicle with a degree of directional control so that he may maneuver the craft toward less hostile territory. One control means may comprise a flexible motion transmitting linkage including a rotary or reciprocable element such as is discussed hereinafter.

Turbine engine 58 also imparts turning movement to the extended rotor blades since gases from such engine, preferably bled off of the forward turbine compressor plenum 62, are conducted through gas duct 64 upwardly through bracket 56, coupling joint 57 and into the support fixture 42; thence through the tubular stem 46 and ports in the blade hub portions until such gases pass radially outwardly through the hollow interior passages of the four telescoping rotor blades to finally emerge through thrust jets 66 at the tips thereof so oriented, as shown in FIG. 4, as to impart rotary movement to the rotor blades.

The horizontally oriented support fixture 42 may be provided with a control arm 54 comprising a hollow tube having an articulated hollow joint at point 70 where a hollow elbow is provided and continuing in a short hollow extension 72 terminating at the far end in a rotor speed control hand grip 74. Since the control arm assembly is internally hollow and ports into a pressurized gas duct 64 it serves as a convenient "by-pass" for propellant gas in excess of rotor tip needs. Rotor speed control hand grip 74 may include a flow control valve which can be opened and closed by rotary movement of grip 74 to by-pass from the end of the grip greater or lesser amounts of the pressurized turbine gas and hence control rotor speed. Limit stops 71 may be provided to control movement of joint 70.

In order to permit both sets of telescoped rotor blades to be folded and accommodated in the storage location immediately to the rear of the seat back, each set is provided with resilient means normally urging the blades toward the unfolded or extended position. Also each set has stops to limit such unfolding movement. All of this must be accomplished without interfering with the flow of turbine gas to the rotor tips. For this reason communicating ports or openings are provided in the hub portions of the rotor blades as shown, and latch means are provided to retain the parts in their extended or operating position.

Figure 5:
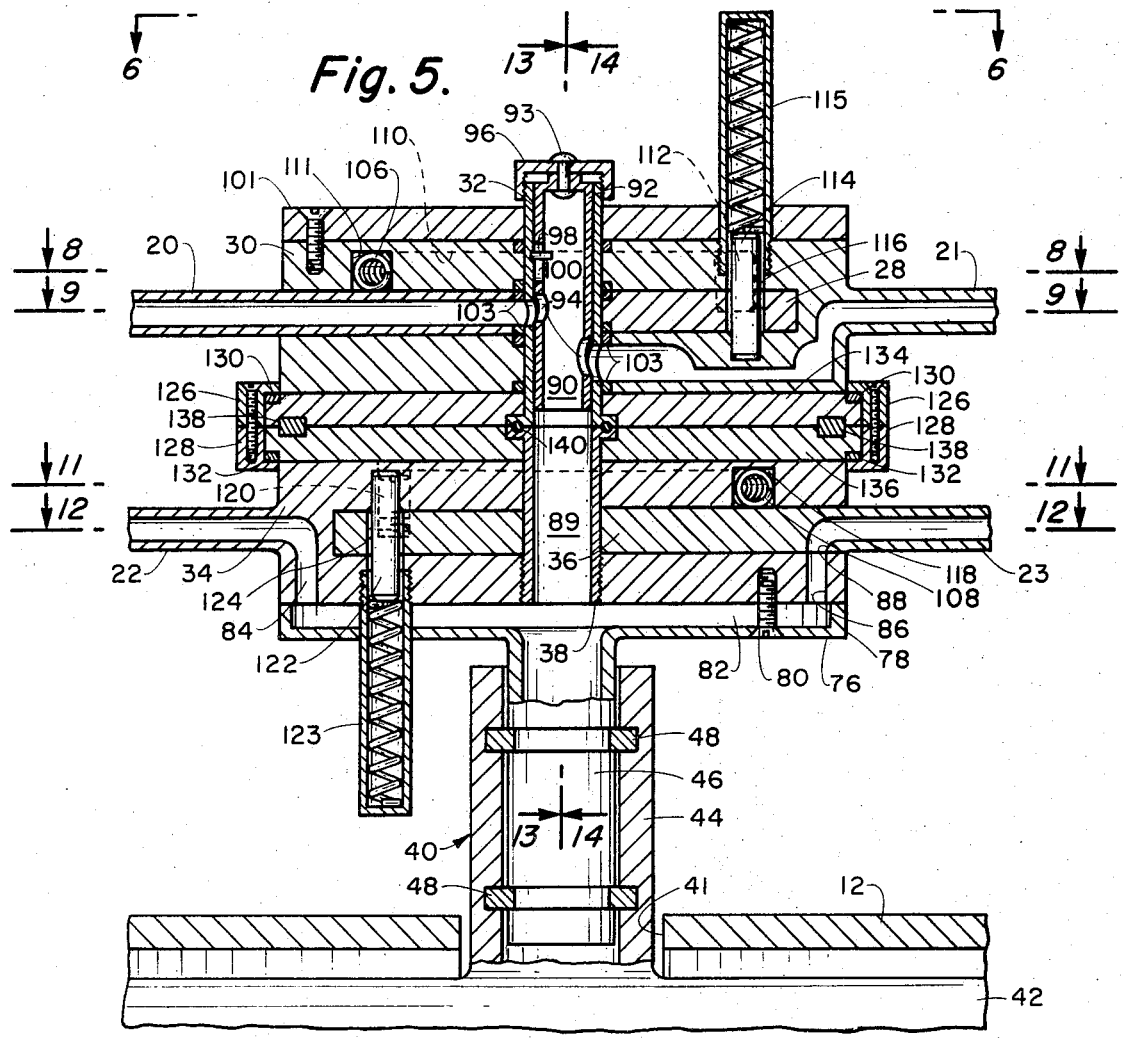
FIG. 5 is a greatly enlarged vertical sectional view taken along a line substantially corresponding to line 5—5 of FIG. 4 through the assembled hub portions of an erected rotor assembly showing the four contrarotating blades in extended position.

The details of the contrarotating hub assembly are shown in FIG. 5 where the interfitting hub parts, the bearings, seals, passages and latch detents are depicted. As there shown the upright sleeve 44 from the seat back mounted support fixture 42 has radial/thrust bearings 48 which in turn support a short rotatable tubular inner stem 46. The rotating parts may be sealed by appropriate seal means if desired.

The upper part of stem 46 depends from the central portion of a bottom cover plate 76 which has an upturned peripheral rim 78. By suitable means such as screws 80, bottom cover plate 76 is held in place and, because of upturned rim 78 a space making a passage 82 is formed to permit radial flow of turbine gas to the periphery of the plate where it passes upwardly through parts 84, 86 in hub 34 into the interior passages of the oppositely directed lower blades 22, 23. It will be noted that hub port 86 registers with blade port 88 in hub portion 36 when they are aligned in order to permit such flow.

The blades of the contrarotating upper rotor assembly receive their turbine air or gas through the axial passage 89 within hollow stub shaft 38 and axial passage 90 in the upper hollow stub shaft 32.

Figure 6:
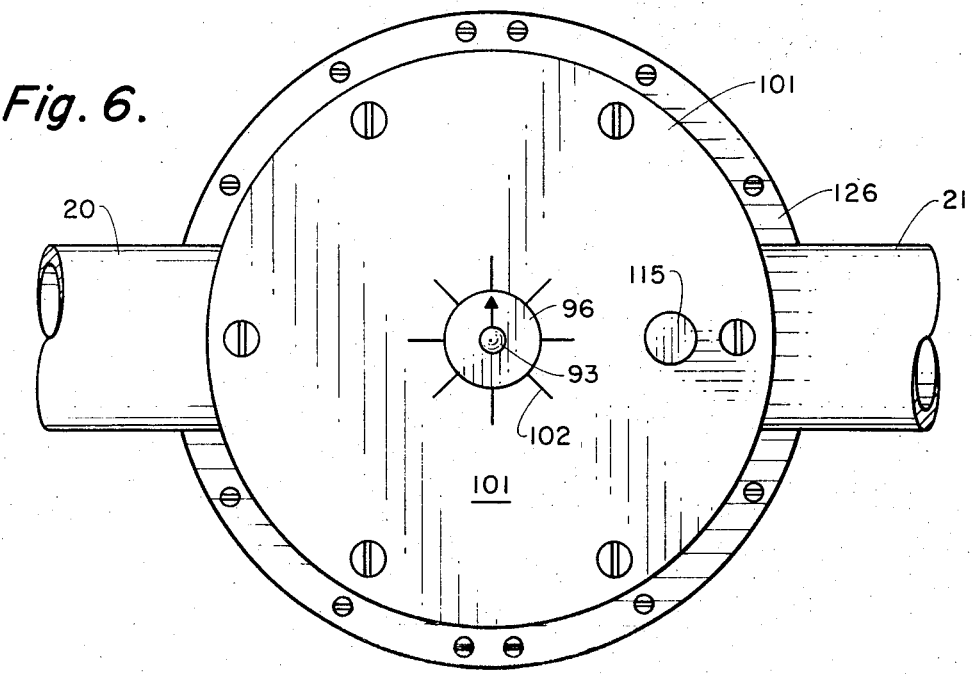
FIG. 6 is a top plan view of the assembled hub portions shown in FIG. 5 taken in the direction of the arrows 6—6 shown in FIG. 5.

If desired the axial passsage 90 may include an adjustable gas flow control means formed by a reciprocable inner sleeve 92 which is vertically adjustable within upper tubular stub shaft 32 to vary the registry of radial openings 94 with coinciding openings in stub shaft 32. By this arrangement, up and down adjustment of inner sleeve 92 through rotation of internally threaded gas flow adjustment cap 96 varies the registry of openings 94 and their adjacent openings in sleeve 32 and hence the gas flow to the upper rotor baldes. Cap 96 is pivotably affixed to the upper end of inner sleeve 92 by rivet 93 and relative rotation of sleeve 92 is prevented by alignment pin 98 which is slidably received in guide slot 100. If desired, indicia 102 (FIG. 6) on rotor cap plate 101 may cooperate with an arrow on cap 96 to show the extent of rotational adjustment of cap 96. Leakage between the relatively rotating parts may be prevented by the numerous seals 103 interposed between adjacent moving surfaces.

Figure 7:
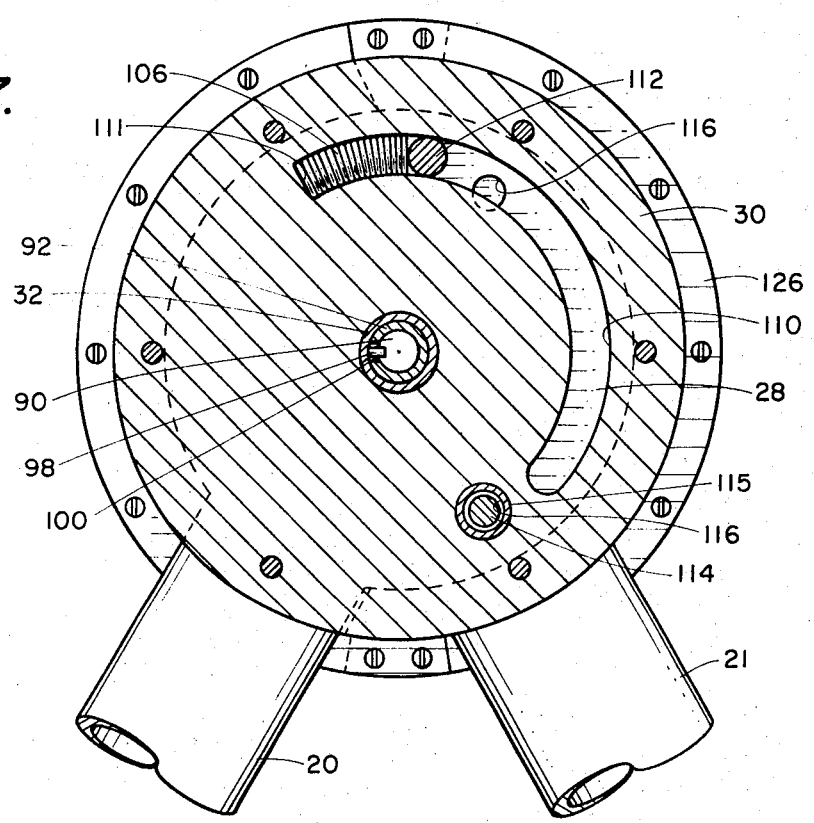
FIG. 7 is a transverse sectional view of the upper rotor hub assembly in its folded or stowed position but in all other respects is similar to FIG. 8.
Figure 8:
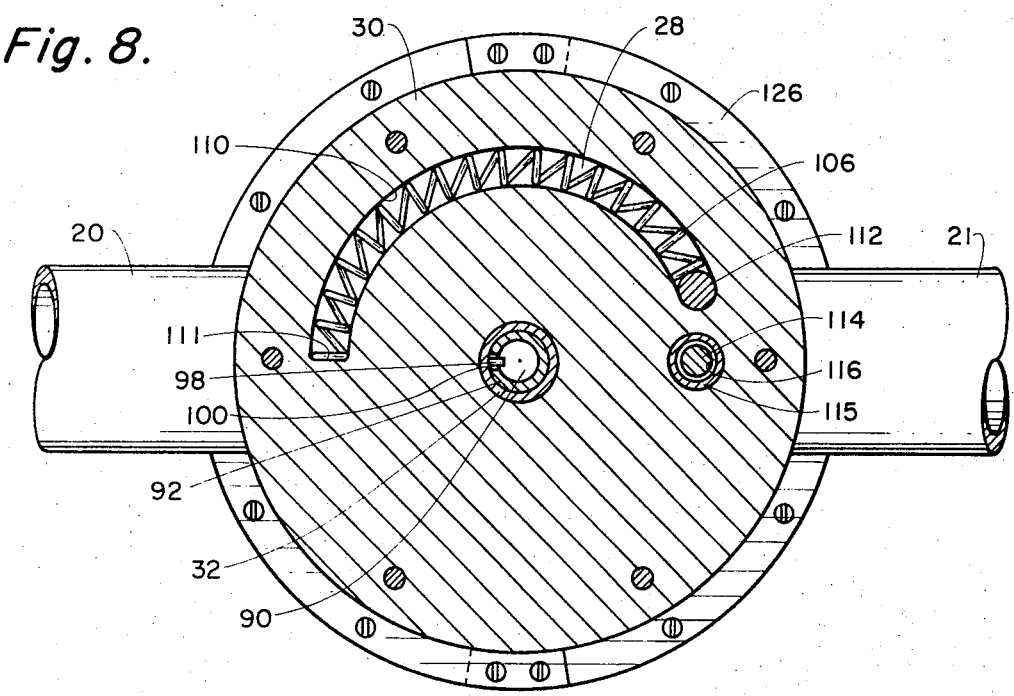
FIG. 8 is a transverse sectional view taken along a line substantially corresponding to line 8—8 of FIG. 5 and showing the upper rotor blade hub parts of FIG. 7 in their blade extended or in-flight position.

In order to move the respective blades of the two sets of rotors into their opposed operating positions as soon as the blade tips are clear of the tip restraining pocket 104 there are provided arcuately confined compression springs 106 and 108, one for each pair of blades. Upper rotor opening movement actuating spring 106 for the upper rotor assembly lies in upper arcuate slot 110 (FIG. 7) in hub assembly 30 with one end bearing against an end wall 111 of the arcuate slot 110 while the other bears against the side of a pin 112 projecting upwardly from hub 28. By this means there is a continual spring pressure attempting to urge the rotor blades 20 and 21 into their extended or diametrically opposed operating position shown in FIGS. 4, 5, 6 and 8.

When the blades reach their 180° opposed position a spring biased detent, or latch, such for example as upper hub latch pin 114, is forced through a pin receiving opening 116 in hub portion 28 to retain the parts securely in their extended position.

Figure 10:
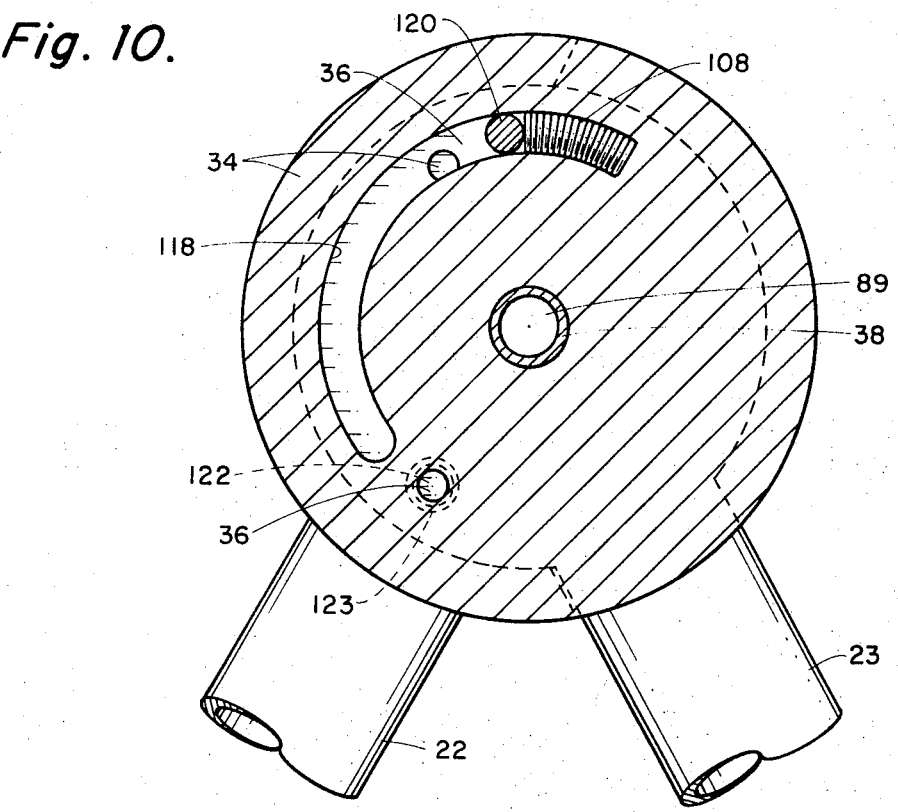
FIG. 10 is a view similar to FIG. 7 but showing the lower rotor hub assembly in its stowed position.
Figure 11:
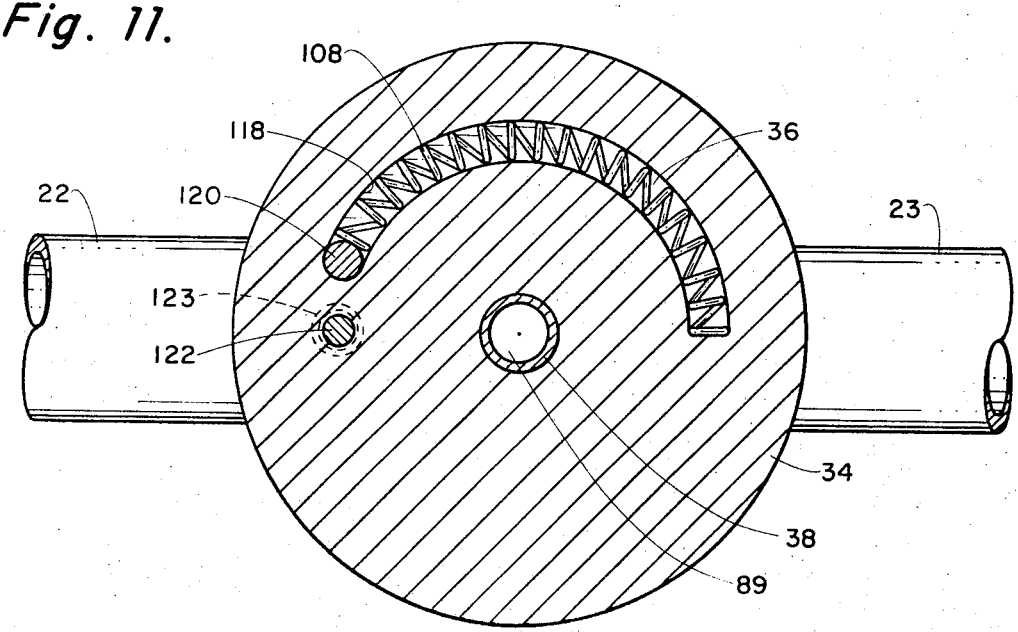
FIG. 11 is a transverse sectional view taken along a line substantially corresponding to line 11—11 of FIG. 5 and showing the lower rotor blade hub parts of FIG. 10 in their blade extended or in-flight position.
Figure 13:
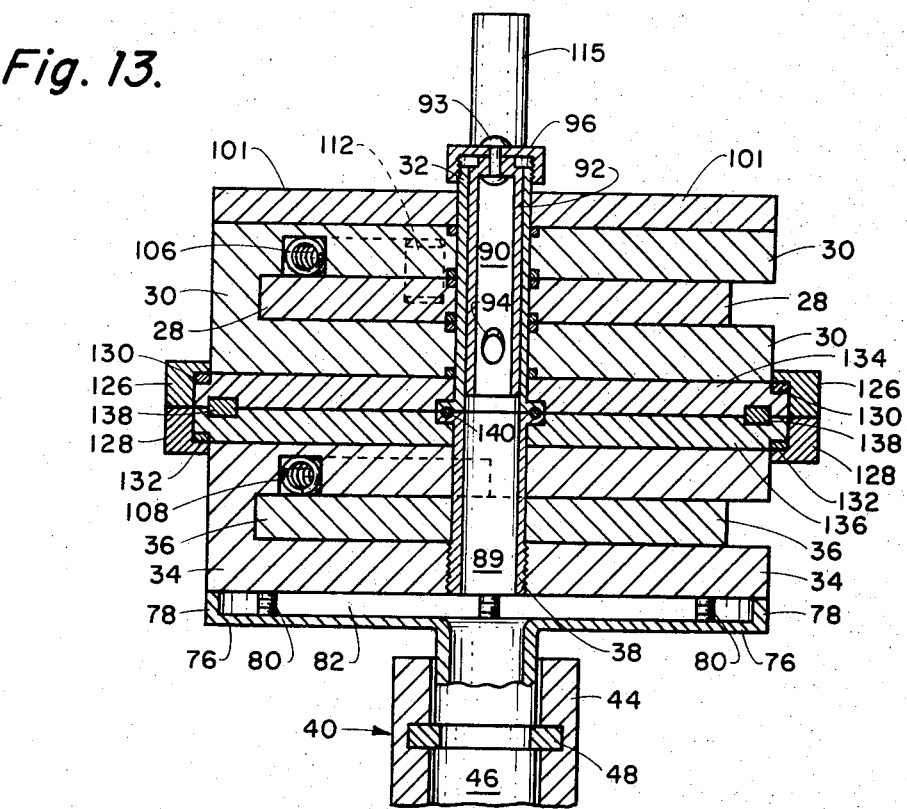
FIG. 13 is a vertical sectional view taken along the axis of the complete hub assembly shown in FIG. 5 but looking in the direction of the arrows 13—13 of FIG. 5.
Figure 14:
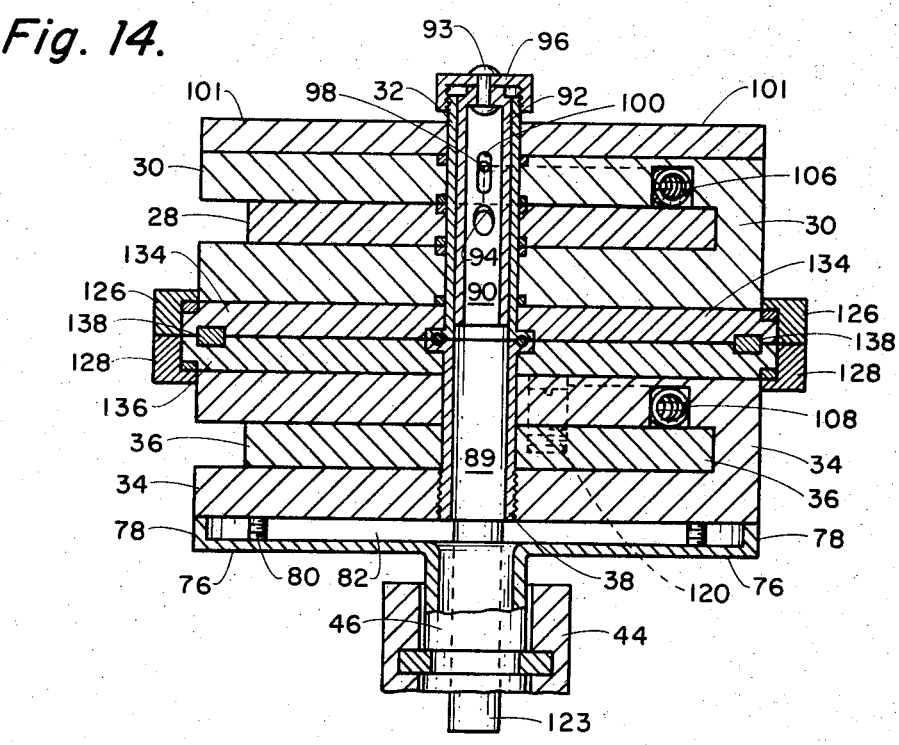
FIG. 14 is a view similar to FIG. 13 but looking in the direction of the arrows 14—14 of FIG. 5.

A similar arrangement is utilized to force the blades of the lower rotor assembly into their extended position and retain them there. As shown in FIGS. 10 and 11, it includes an arcuate slot 118 in hub portion 34 within which the lower rotor opening movement actuating spring 108 is received and a pin 120 projects upwardly from hub portion 36 against which one end of the spring 108 bears. Upon 180° extension of the lower blades 22 – 23, spring biased detent or latch pin 122 is forced into opening 124 (FIG. 12) in hub 36 to hold the blades 22 – 23 in diametrically opposed relationship.

The upper and lower rotor hub assemblies may be retained together by any suitable journal arrangement that will permit contrarotation and allow the gas passage therethrough to be sealed. Many sealed journal arrangements exist; however, there is shown in FIG. 5 a peripherally located two-part bearing assembly including separable upper and lower split rings 126 and 128 which may include upper and lower bearing members 130 and 132 which contact and align oppositely rotating upper and lower bearing discs 134 and 136. Between the discs is another bearing 138. By this arrangement, the two discs are retained in journal contact and the hub assemblies are maintained in alignment. As shown, a seal 140 may be interposed between adjacent flanges on upper and lower hollow stub shafts 32 and 38.

The two discs 134 and 136 may be secured to their adjacent hub portions 30 and 34 respectively by any suitable fastening means such as flat head machine screws, not shown.

Figure 9:
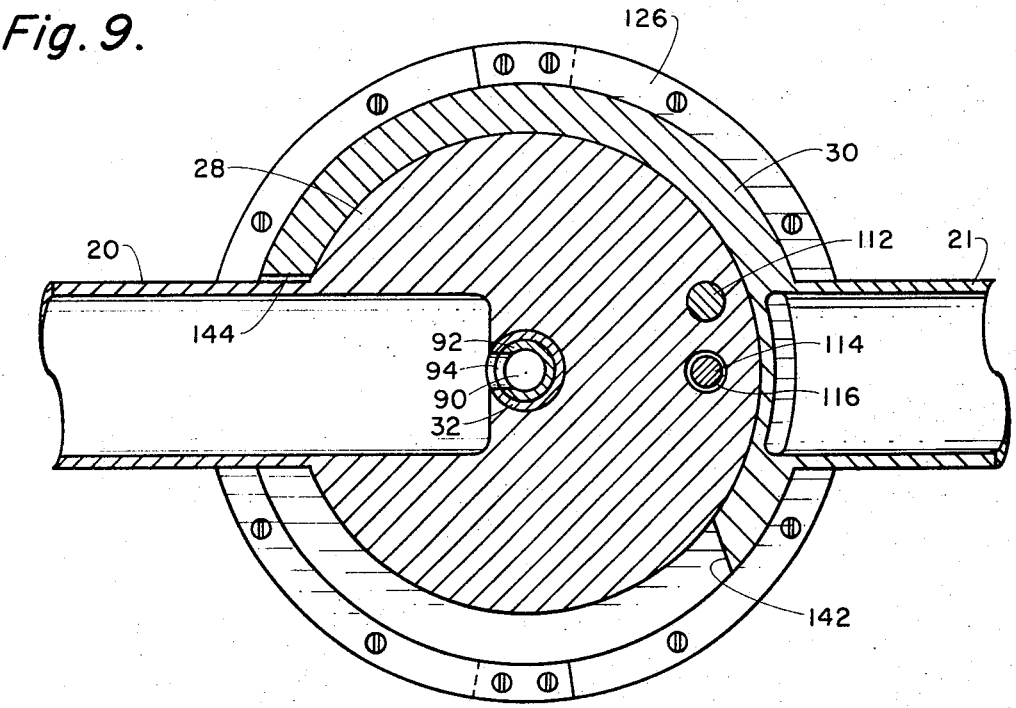
FIG. 9 is a similar view of the upper blade hub assembly taken along line 9—9 of FIG. 5.
Figure 12:
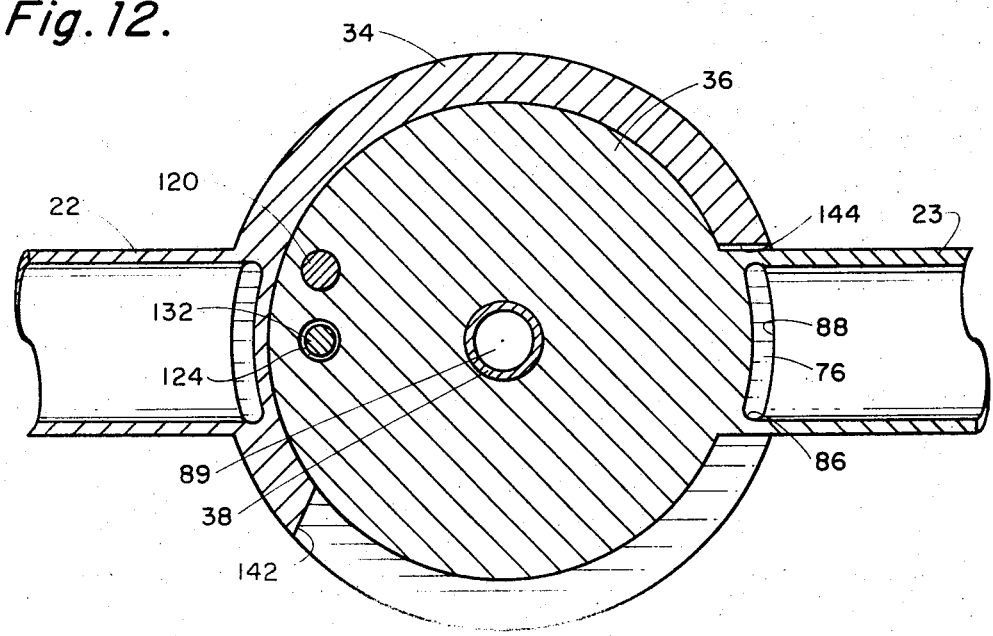
FIG. 12 is a similar view of the lower blade hub assembly taken along line 12—12 of FIG. 5.

From the foregoing it will be apparent that immediately upon ejection of the seat the rotor blades separate into diametrically opposed positions. The blade movements into their stowed positions may be controlled by blade stops 142 and into their open positions by blade stops 144 (FIGS. 9 and 12). The rotor attitude control arm 54 automatically moves to a position alongside the right shoulder of the operator whereupon he may grasp it and manipulate it to head the escape vehicle in the desired up or down direction. At the same time, through rotation of a two-part hand grip, he may control the direction of the vehicle since sleeve 137 of such grip is interconnected to a blast deflecting rudder member or shifting member for nozzle 60 through a remote control cable member 139 as is well known in remote control situations. Some cable devices of this character are known as "Bowden" cable controls.

Through manipulation of sleeve 74 which may enclose an iris type valve the escape of gas ported from duct 64 is controlled and thereby both rotor speeds and hence the rate of vehicle ascent and descent are varied.

Though not shown in detail the telescoping outer blade portions 24, 25, 26 and 27 may be provided with suitable stops to limit outward movement of such outer blade portions.

Though illustrated as a twin rotor vehicle, it will be apparent that a single rotor model could also be constructed and used.

Obviously many modifications and variations of the present invention are possible in the light of the above teachings. It is therefore to be understood that within the scope of the appended claims the invention may be practiced otherwise than as specifically described.

I claim:

1. An aircraft occupant survival vehicle, including an ejection seat assembly whereby an aircraft occupant located in said seat is forcibly separated from the aircraft and transported through space in a controlled fashion to a safe landing area, comprising:
   a. a catapultable aircraft occupant seat including a bottom portion, said seat being adapted for mounting on an aircraft fuselage structure for separation therefrom upon command;
   b. means for separating said seat from the aircraft fuselage;
   c. a plurality of internally hollow, airfoil contoured, rotor blades movable from a stored position to an operational position; said rotor blades including a blade propelling gas exit nozzle located adjacent the tip portions thereof and in communication with said hollow interior;

d. a rotor hub movable from a stored position to an operational position mounted on the back portion of the seat and supporting said rotor blades; said rotor hub being ported to conduct a pressurized gas to the hollow interior of each blade;

e. a gas pressure source located in the seat for driving said rotor blades and hub; and f. a gas duct located in the seat for conducting pressurized gas from the gas source to the gas exit nozzles adjacent the blade tips through the ported hub and hollow interior of the blades.

2. The device of claim 1 including an occupant controlled pressure release valve mechanism for venting off excess gas from said pressure source.

3. The device of claim 1 including gas pressure control means provided on the rotor assembly to permit control of gas flow to one of said contrarotating hub blade assemblies relative to the gas flow to the other of said assemblies.

4. The device of claim 1 including a control arm connected for movement into a position adjacent one side of the operator with movement of the rotor hub assembly to the operational position.

5. The device of claim 1 wherein the blade and hub assembly comprises two sets of rotors arranged for contrarotation.

6. The device of claim 2 wherein the gas pressure source also provides gas discharge through a rearwardly directed discharge nozzle to impart forward motion to said vehicle:

and the directional movement of the vehicle can be varied by an occupant adjustable control connected to such vehicle propelling discharge nozzle.

7. The device of claim 1 wherein each rotor blade has an inboard and an outboard portion telescopically arranged so as to allow blade elongation along its axis to thereby increase the effective blade surface area.

8. The device of claim 1 wherein the rotor assembly includes resilient means normally urging the blades from the stored position to the operating position with blade ends oppositely extending.

9. The device of claim 8 wherein latch means are provided to retain the blades in their oppositely extending position.

* * * * *